No. 841,743. PATENTED JAN. 22, 1907.
G. A. WALL & J. H. DERBY.
ALARM GAGE.
APPLICATION FILED FEB. 17, 1904.

2 SHEETS—SHEET 1.

Witnesses:

Inventors:
George A. Wall
John H. Derby
by Maynadier & Rockwell
Attorneys.

No. 841,743.

PATENTED JAN. 22, 1907.

G. A. WALL & J. H. DERBY.
ALARM GAGE.
APPLICATION FILED FEB. 17, 1904.

2 SHEETS—SHEET 2.

Witnesses:
C. B. Maynadier
H. B. Donkin

Inventors:
George A. Wall
John H. Derby
by Maynadier and Rockwell
Attorneys.

UNITED STATES PATENT OFFICE.

GEORGE A. WALL, OF PROVIDENCE, RHODE ISLAND, AND JOHN H. DERBY, OF BROOKLINE, MASSACHUSETTS, ASSIGNORS, BY DIRECT AND MESNE ASSIGNMENTS, TO BOSTON AUTOMATIC FIRE ALARM COMPANY, OF BOSTON, MASSACHUSETTS, A CORPORATION OF MAINE.

ALARM-GAGE.

No. 841,743.      Specification of Letters Patent.      Patented Jan. 22, 1907.

Application filed February 17, 1904. Serial No. 194,014.

*To all whom it may concern:*

Be it known that we, GEORGE A. WALL, of Providence, in the county of Providence and State of Rhode Island, and JOHN H. DERBY, of Brookline, in the county of Norfolk and State of Massachusetts, have invented an Improved Alarm-Gage, of which the following is a specification, reference being had to the accompanying drawings, making a part hereof.

Our invention is a pressure-gage combined with a circuit-closer in which the electrodes of the circuit-closer are electrically connected and disconnected by the movement of a conductor whose motion is derived from the mechanism which rotates the index-arbor of the gage. While pressure-gages have been heretofore combined with a circuit for giving an alarm by making the index of the gage a part of the alarm-circuit, we have retired the index of the gage from such duty and use electrodes wholly independent of the gage in combination with a circuit-closer, which is actuated by the tick of the gage and which bridges those electrodes to make the alarm-circuit and removes that bridge to break the alarm-circuit for high pressure and for low pressure, and this is true in whatever position the gage may be placed. This feature of the invention is, in other words, the combination of a gage with a circuit-closer which is independent of the gage except that it partakes of the movements of the mechanism of the gage, but of course without unduly hampering those movements.

Other features of our invention relate to the preferred form of construction now to be explained, and all the features are more fully described and particularly pointed out and distinctly claimed below.

Figure 1:
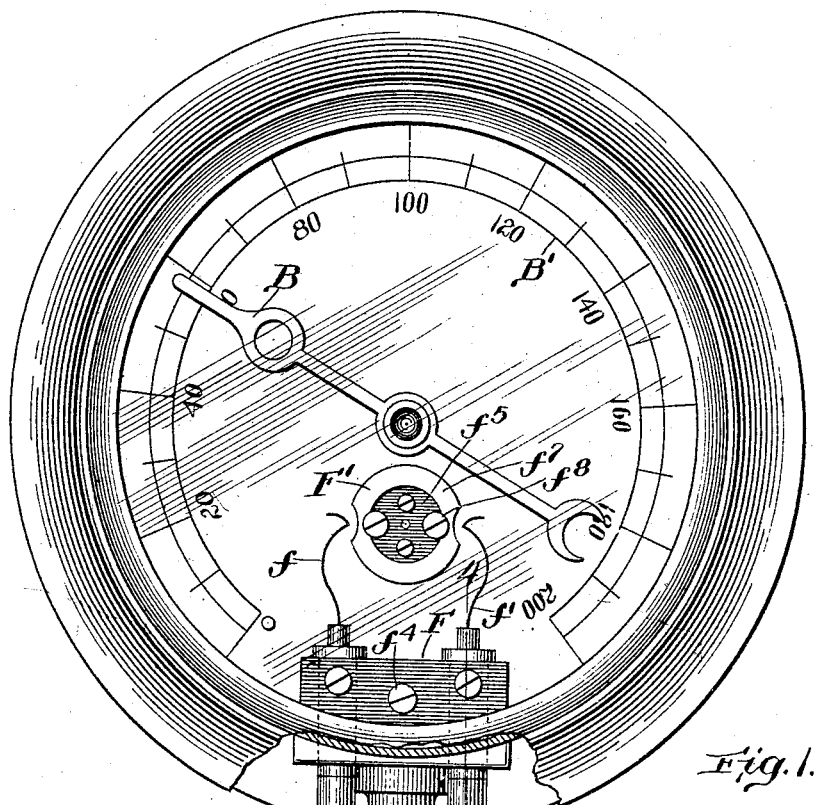
Figure 4:
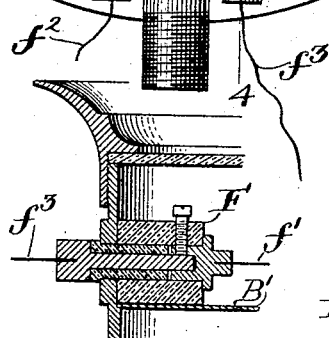
Figure 2:
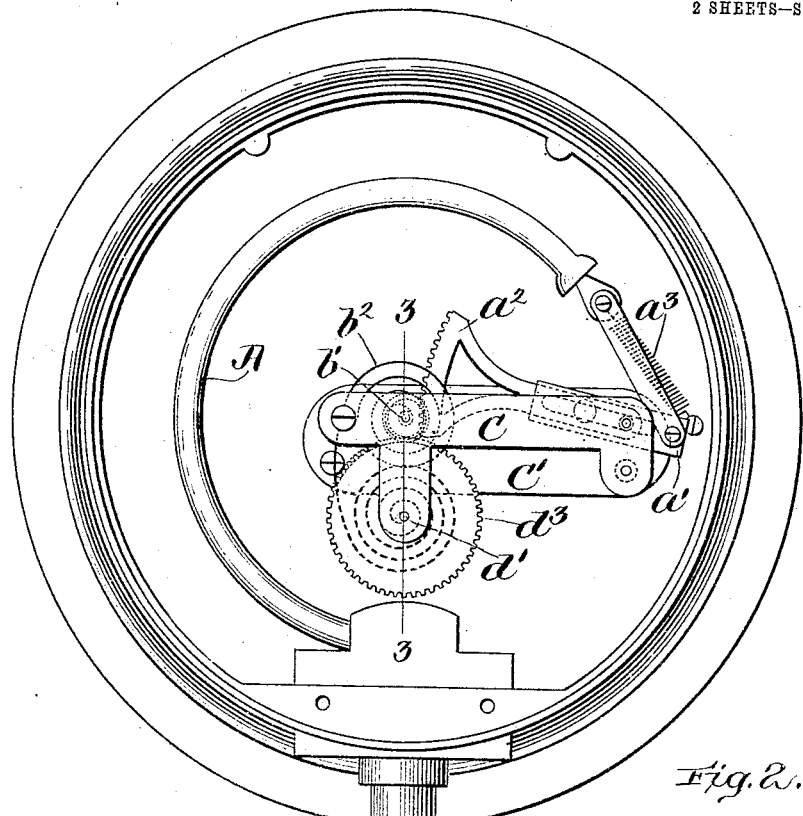
Figure 3:
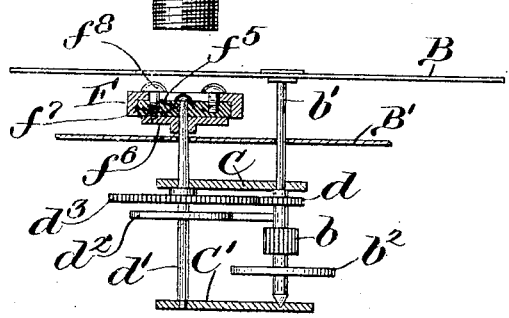

In the drawings, Figure 1 is a face view of our alarm-gage in its preferred form, partly broken away. Fig. 2 is also a face view, but with the circuit-closer, index, and dial removed to show the mechanism of the gage and circuit-closer. Fig. 3 is a cross-section on line 3 3 of Fig. 2. Fig. 4 is a sectional elevation of part of the fixed member of the circuit-closer, taken on line 4 4 of Fig. 1.

The gage-tube A is the usual bent tube secured at one end to the tube-holder and linked at its other end to lever $a'$, adjustably connected with segmental lever $a^2$ and provided with the retracting-spring $a^3$, all as usual and so that as tube A is straightened more or less by the pressure of the fluid which fills tube A and against the pull of retracting-spring $a^3$ the segmental lever $a^2$, which meshes with pinion $b$, fast on shaft $b'$, will rotate that shaft $b'$ in a direction against the force of the shaft-spring $b^2$, and thereby move index B back and forth over dial B' as the pressure varies in tube A. All this will be fully understood by all skilled in the art without further description. We add a screw-pinion $d$ to shaft $b'$, which meshes with a pinion $d^3$ on shaft $d'$, which carries the movable member of the circuit-closer. A shaft-spring $d^2$ is used on shaft $d'$ much as shaft-spring $b^2$ is used on shaft $b'$ and for a like purpose. The plates C C' constitute frames for the moving parts.

The fixed member of the circuit-closer consists of the electrodes $f$ $f''$, electrically connected, respectively, with the wires $f^2$ $f^3$ and mounted on insulating-block F, which is held by screw $f^4$ to the dial of the gage, all arranged so that the electrodes $f$ $f''$ can be adjusted in proper relation to the movable member F' of the circuit-closer. This movable member F' consists of a disk $f^5$, of fiber or other non-conductor, secured to the metal disk $f^6$, whose hub has a tapering hole to fit the upper end of shaft $d'$, and disk $f^5$ carries the conductor $f^7$, which is adjustably held in place by the heads of screws $f^8$. (See Fig. 3.)

Conductor $f^7$ is notched in order that when adjusted as shown in Fig. 1 the electrodes $f$ $f''$ will be out of contact with conductor $f^7$, but when the index B has been moved to indicate a certain rise or fall of pressure conductor $f^7$ will be moved correspondingly and will electrically connect electrodes $f$ $f''$ and close the alarm-circuit through wires $f^2$ $f^3$. In the example shown the alarm-circuit will remain open while the pressure shown by the gage is from fifty to seventy, but will be closed when the pressure falls to fifty and remain closed while the pressure is below fifty, and will also be closed when the pressure rises to seventy and remain closed while the pressure is above seventy.

While the main feature of our invention is a circuit-closer whose movable member is actuated by the tube of the gage and bridges the electrodes of the fixed member, which are independent of the index, yet a second feature of our invention is a circuit-closer whose electrodes $f\ f'$ are fixed on an insulating-block suitably secured to the gage-casing or to the dial when bridging-conductor is between those electrodes and notched or cut away at opposite points to prevent contact with the electrodes while the gage is not giving an alarm, but simply indicating pressure. Our purpose is to provide a circuit-closer which will not affect the operation of the gage while the pressure is rising or falling between prescribed limits, but will allow the index of the gage to indicate pressure above and below those prescribed limits with only a very slight reduction of accuracy, while the presence is above or below the prescribed limits, for while the friction of the bridging-conductor is *nil*, while the pressure indicated by the gage is within the prescribed limits, it need not be material after the notches of the bridging-conductors have been moved to make contact by a rising pressure above those limits or by a falling pressure below those limits. This result is secured mainly by the notches in the periphery of the bridging-conductor $f^7$ and the rearrangement of electrode $f\ f''$; but the fact that pinion $d$ on shaft $b'$ may be of materially smaller diameter than pinion $d^3$ on shaft $d'$ enables us by this combination of these two shafts with the gage-tube A by means of pinions $d$ and $d^3$ to apply the power of tube A to so much better advantage that while the resistance to the movement of shaft $d'$ is somewhat increased when the electrodes bear on the periphery of conductor $f^7$, the effect of that necessary but slight increase of resistance to the movement of conductor $f^7$ is practically imperceptible, and this is a third feature of our invention.

The operation will be plain without further description.

What we claim as our invention is—

1. In combination a pressure-gage; an alarm-circuit; its electrodes; a bridge-conductor between the electrodes and being substantially circular except at one or more portions which are recessed; and means connecting the gage and conductor to operate the conductor and thereby break the alarm-circuit when the recess is opposite either electrode and to make the circuit at other times.

2. In combination a pressure-gage; an alarm-circuit; its electrodes; a bridge-conductor between the electrodes and being substantially circular except at portions normally opposite the electrodes where it is recessed; and means connecting the gage and conductor to operate the conductor and thereby break the alarm-circuit when the recesses are opposite the electrodes and to make the circuit at other times.

3. In an alarm-gage the combination of a pressure-gage; its tube; a shaft carrying the index-finger of the gage; means connecting the tube and shaft to operate the shaft; a pinion mounted on that shaft; a second shaft; electrodes; a bridge-conductor mounted on that second shaft to connect the electrodes; and a second pinion mounted on the second shaft and meshing with the first pinion, substantially as, and for the purpose, described.

GEO. A. WALL.
JOHN H. DERBY.

Witnesses:
C. B. MAYNADIER,
G. A. ROCKWELL.